United States Patent [19]

Lin

[11] Patent Number: 4,518,551
[45] Date of Patent: May 21, 1985

[54] METHOD AND APPARATUS FOR TRIMMING AND FINISHING THE OUTER EDGE OF A MOLDED RECORD

[75] Inventor: Peter T. Lin, East Brunswick, N.J.

[73] Assignee: RCA Corporation, Princeton, N.J.

[21] Appl. No.: 605,242

[22] Filed: Apr. 30, 1984

[51] Int. Cl.³ .............................................. B29D 17/00
[52] U.S. Cl. ..................................... 264/107; 264/161; 264/296; 264/322; 425/297; 425/305.1; 425/315; 425/806; 425/810
[58] Field of Search ............... 264/107, 161, 162, 163, 264/296, 322; 425/296, 297, 305.1, 315, 806 R, 810

[56] References Cited

U.S. PATENT DOCUMENTS

| | | | |
|---|---|---|---|
| 3,186,029 | 6/1965 | Joseph | 425/806 R X |
| 3,412,427 | 11/1968 | Flusfeder et al. | 18/5.3 |
| 4,005,965 | 2/1977 | Roczynski | 425/810 X |
| 4,326,325 | 4/1982 | Chambers et al. | 29/27 |

FOREIGN PATENT DOCUMENTS

| | | |
|---|---|---|
| 0044608 | 5/1981 | European Pat. Off. . |
| 1269170 | 4/1972 | United Kingdom ................ 425/810 |

Primary Examiner—Thomas P. Pavelko
Attorney, Agent, or Firm—Birgit E. Morris; Edward J. Sites

[57] ABSTRACT

A method and apparatus is provided for trimming flash from the outer edge of thermoplastic molded records and then finishing the outer edge. A molded record having flash on its outer edge is supported on a turntable and then rotated about its center. The flash and the outer edge of the record immediately adjacent the flash are selectively heated, preferably by using a focused infrared lamp, to a temperature above the glass transition temperature. A cutter is then advanced tangentially through the flash to remove the heat-softened flash from the record. The trimmed outer edge is then finished by bringing a shaped surface into contact with the softened edge and holding it there while rotating the record until the outer edge has the desired finished configuration. The heating is discontinued and the trimmed and finished outer edge is allowed to solidify.

18 Claims, 16 Drawing Figures

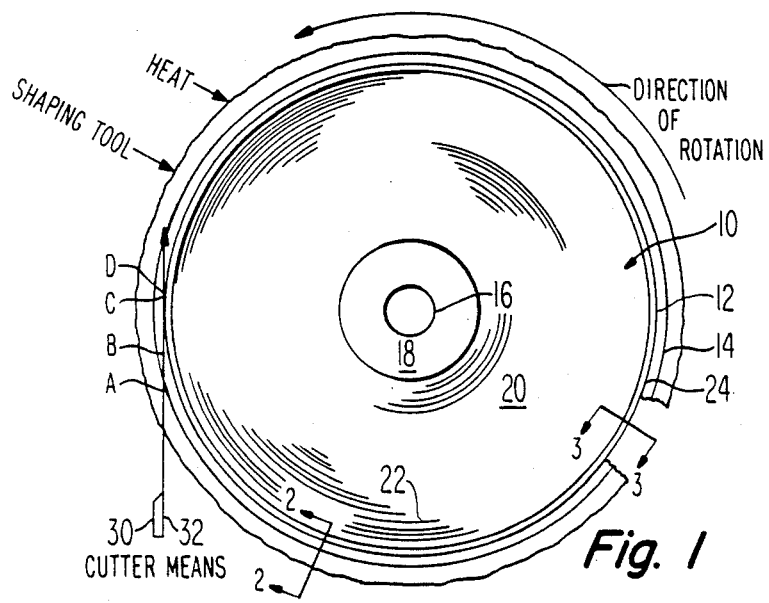
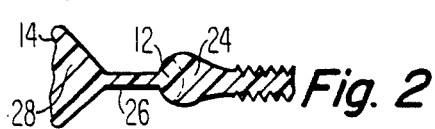
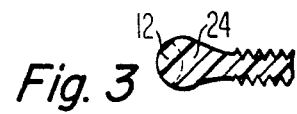
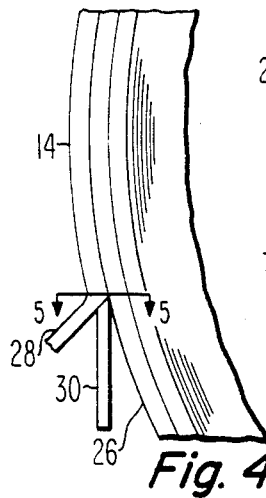
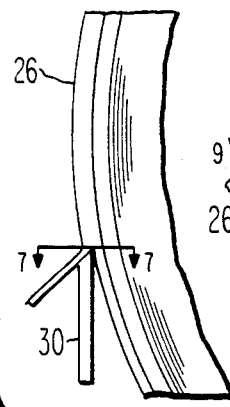
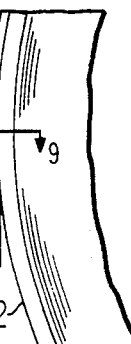
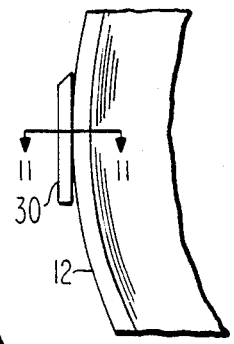
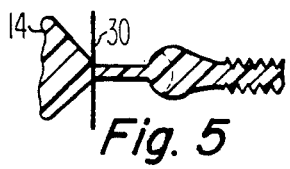
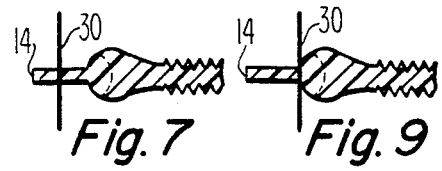
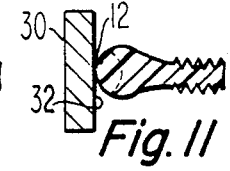

METHOD AND APPARATUS FOR TRIMMING AND FINISHING THE OUTER EDGE OF A MOLDED RECORD

This invention relates to a method and apparatus for trimming flash from the outer edge of a molded record and more particularly is concerned with an improvement in the finishing of the outer edge.

BACKGROUND OF THE INVENTION

Molded records, such as conventional audio records or the more recently developed capacitive electronic discs, are manufactured by molding a charge of a thermoplastic composition between a pair of metal parts, referred to as stampers, which have defined in their molding surfaces a mirror image of the pattern desired to be pressed into the molded record. It is conventional to use a charge of the thermoplastic composition which is somewhat larger than that required to exactly mold the record in order to insure that the molded record will not have any voids and that it will be of a uniform density. The excess material in the charge is forced out from between the stampers during the pressing of the record and forms a ring of material around the outer edge of the molded record which is referred to as flash. After the record has been pressed it is necessary to remove the flash from the outer edge of the record and to finish the outer edge to a smooth and precise diameter.

Removing the flash and finishing the outer edge of records is a source of considerable manufacturing problems. One of the major problems which is encountered is breakage of the molded records during trimming. This typically results in sections of the outer portions of the molded records being broken out from the records. Edge cracking is an additional related problem. Microcracks are often formed at the outer edge during trimming which eventually grow into large cracks which destroy the records. A still further problem which is encountered is that the outer edge of the molded records is often left in a roughened condition and not sufficiently round for proper playback. The above-noted problems and other similar problems are especially acute in manufacture of capacitive electronic discs which are heavily loaded with conductive carbon particles.

Many of the manufacturing problems encountered in trimming the flash and finishing the outer edge of records can be attributed to brittleness of the solidified thermoplastic compositions. It is necessary that the molded records be solidified prior to removal from the molding press to prevent warp which will distort the information in the recorded area of the record. However, as the thermoplastic compositions solidifies, the records become relatively brittle and more susceptible to mechanical damage. It has been found, for example, that the carbon-filled capacitive electronic discs are relatively brittle and prone to breakage, edge cracking and are especially difficult to finish.

Various methods and apparatus have been suggested for trimming flash from molded records and for finishing the outer edge of the record. The use of opposing rotary cutter wheels has been suggested, but this apparatus has not proven satisfactory because the rotary wheels tend to pinch the flash and cause a rough, uneven cut. It has also been suggested to use a hot knife to trim the flash, but this has proven to be unsatisfactory as it requires a separate power source for the knife and the edge tends to be distorted. Flusfeder et al. in U.S. Pat. No. 3,412,427, entitled "Apparatus For Manufacturing Disc Records," discloses the use of a pair of overlapping blades for trimming the flash from records. The apparatus which is disclosed is of an overly complex design which makes it difficult to consistently obtain satisfactory results in trimming the flash and no provision is made for finishing the trimmed edge. Pullen et al. in European patent application EP No. 0 044 608 A1, entitled "Improvements Relating To Flash Trimming Of Disk Record," discloses the use of a scissor type cutter which is brought in on a tangent to trim the flash. No provision, however, is made for finishing the trimmed edge. Chambers, et al. in U.S. Pat. No. 4,326,325, entitled "Method And Apparatus For Deflashing Molded Discs," discloses a dual trimming system in which a knife is used to remove the majority of the flash and then a rotary cutter is used to remove the remainder of the flash. The Chambers et al. method provides somewhat better control of flash removal as compared to the other well-known methods, but the outer edge of the disc is left in a considerably roughened condition by the rotary cutter. All of the methods and apparatus heretofore disclosed, while being marginally acceptable for conventional records, were found under production conditions to be unsuitable for trimming flash and finishing the outer edge of capacitive electronic discs.

It would be highly desirable if a method and apparatus could be provided for trimming the flash and finishing the outer edge of records without causing breakage, edge cracking and other such problems.

BRIEF SUMMARY OF THE INVENTION

A method and apparatus is provided for trimming flash from the outer edge of thermoplastic molded records and then finishing the outer edge. A molded record having flash on its outer edge is supported on a turntable and then rotated about its center. The flash and the outer edge of the record immediately adjacent the flash are selectively heated, preferably by using a focused infrared lamp, to a temperature above the glass transition temperature of the thermoplastic composition. A cutter is then advanced tangentially through the flash to remove the heat-softened flash from the record. The trimmed outer edge is then finished by bringing a shaped surface into contact with the softened edge and holding it there while rotating the record until the outer edge has the desired finished configuration. The heating is discontinued and the trimmed and finished outer edge is allowed to solidify.

BRIEF DESCRIPTION OF THE DRAWING

FIG. 1 is a top plan view of a molded record having flash on the outer edge with a part of the flash broken away for purposes of illustrating the invention. The figure also includes indicia for explaining the method of this invention.

FIG. 2 is a cross-sectional illustration of the untrimmed outer edge of the molded record taken as indicated by the lines and arrows 2, 2 on FIG. 1.

FIG. 3 is a cross-sectional illustration of the trimmed edge of the molded record as indicated by the lines and arrows 3, 3 on FIG. 1.

FIG. 4 is an illustration of a section of the molded record as it is being trimmed at point A on FIG. 1.

FIG. 5 is a cross-sectional illustration taken as indicated by the line and arrows 5, 5 on FIG. 4.

FIG. 6 is an illustration of a section of the molded record as it is being trimmed at point B on FIG. 1.

FIG. 7 is a cross-sectional illustration taken as indicated by the lines and arrows 7, 7 on FIG. 6.

FIG. 8 is an illustration of a section of the molded record as it is being trimmed at point C on FIG. 1.

FIG. 9 is a cross-sectional illustration taken as indicated by the line and arrow 9, 9 on FIG. 8.

FIG. 10 is an illustration of a section of the molded record as the edge is being finished at point D on FIG. 1.

FIG. 11 is a cross-sectional illustration taken as indicated by the lines and arrows 11, 11 on FIG. 10.

DETAILED DESCRIPTION OF THE INVENTION

Figure 12:
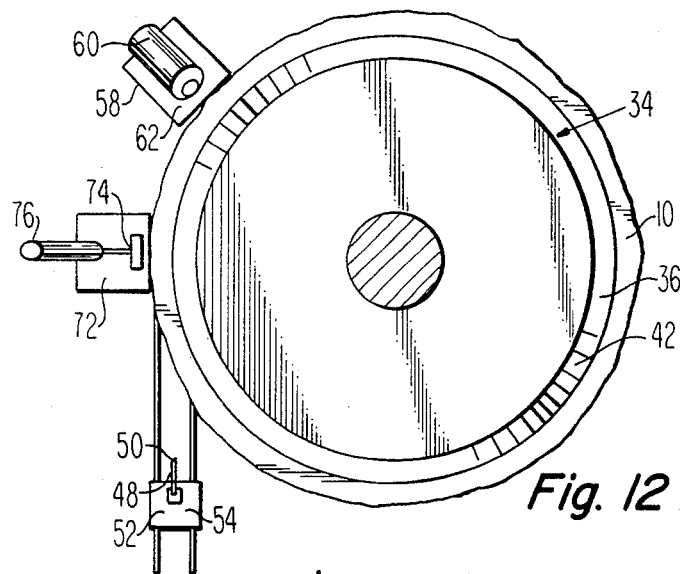
FIG. 12 is a top plan schematic illustration of a trimming apparatus constructed in accordance with the present invention.

In FIG. 1, there is illustrated a molded record 10 which still has attached to the outer edge 12 a ring of flash 14 from the molding process. The record 10, as illustrated, has a center hole 16, an unrecorded section 18, a recorded area 20, in which an information track 22 having the signal information defined therein is present, and a protective bead 24 which extends to the outer edge 12. The flash 14 is comprised of a relatively thin web 26 which extends from the outer edge 12 of the record 10 and a substantially thicker, irregularly shaped section 28. The molded record 10, with the flash 14 still attached, will have the edge cross-sectional configuration illustrated in FIG. 2. After the flash 14 is trimmed in accordance with the method invention, the cross section of the outer portion of the record 10 will have the configuration illustrated in FIG. 3.

The method of the present invention is comprised of a number of sequential steps. The molded record 10 is received from the pressing operation with flash 14 still attached to its outer edge 12. The record 10 is placed on a suitable support, then rotated about its center. The record 10 with flash 14 attached to its outer edge 12 as received from the pressing operation should be fully solidified; however, it should preferably still be relatively hot in order to facilitate heating the flash 14. The record 10, with the flash 14 attached to its outer edge 12, is rotated in a flat plane of rotation. As the record 10 is rotated, the flash 14 on the outer edge 12 is selectively heated by focusing a heat source directly on the flash 14 and outer edge 12 as the record 10 rotates passed the heat source. Various heat sources can be utilized, such as RF heaters and the like, but it has been found that a highly focused infrared lamp is the most preferred heat source in that it is hightly effective, easily controlled and relatively inexpensive to purchase and operate. The heat source is preferably located immediately before the cutter means 30 used to trim the flash 14 so that there will be a minimum loss of heat from the flash 14 and outer edge 12 of the record 10 before engaging the cutter means 30. The flash 14 and the portion of the record 10 immediately adjacent the outer edge 12, as indicated by the dotted lines on FIGS. 2, 3, 5, 7, 9 and 11, are heated to a temperature above the glass transition temperature of the thermoplastic composition used to mold the record 10. It is preferable, however, to limit the temperature to which the flash 14 is heated to below the flow point of the thermoplastic composition in order to permit a controlled removal of the flash 14 during trimming. If the temperature of the flash is below the glass transition temperature, the molded record 10 will be brittle and tend to break and edge crack will occur during trimming. If the temperature of the thermoplastic composition is raised significantly above the glass transition temperature, for example, to the flow point of the thermoplastic composition, the flash 14 will not be removed smoothly and the outer protective bead 24 will tend to be drawn and distorted during trimming. It is important that the heating of the outer edge 12 be limited to the portion of the area which is immediately adjacent the flash 14 in order to prevent warping of the entire record 10. To limit the amount of heating of the outer edge 12, the heat source is precisely focused on the flash 14 and outer edge 12 of the record 10.

The flash 14 is trimmed from the record 10 preferably by tangentially advancing a cutter means 30 through the heated flash 14. The flash 14 can be removed over the course of only approximately one revolution of the record 10 by rapidly advancing the cutter means 30 through the entire width of the flash 14 to a point on the outer edge 12 of the record 10. However, in practice it has been found preferable to remove the flash 14 over a series of revolutions in that it provides more precise trimming and lessens the danger of breakage and edge cracking. As illustrated in FIGS. 4 to 11, in the preferred method of this invention, the thick irregular shaped section 28 of the flash 14 is initially removed by first plunging the cutter means 30 rapidly through the irregular shaped section 28 and then rotating the record 10 about one full revolution. As illustrated in FIGS. 4 and 5 which show the trimming at point A on FIG. 1, the irregular shaped section 28 of the flash 14 is removed during the first revolution. Thereafter in subsequent revolutions, the cutter means 30 is advanced more slowly in the tangential direction so as to remove the thin web 26 of the remaining flash 14 in a number of revolutions as shown in FIGS. 6 through 9. In FIGS. 6 and 7, the relationship of the cutter means 30 and the flash 14 at point B on FIG. 1 is shown in detail. The cutter means 30 is advancing through the flash 14 to about the mid-point of the thin web 26 of the flash 14. In FIGS. 8 and 9, the relationship of the cutter means 30 to the flash 14 at point C in FIG. 1 is shown in detail. The cutter means 30 is shown as it tangentially approaches and meets the other edge 12 of the record 10.

The gradual removal of the flash 14 over a plurality of revolutions has several advantages. One of the more important advantages is that the removal of the thick irregular section 28 of the flash 14 in the initial rotation allows the thin web 26 of the flash 14 to be exposed directly to a heat source focused in the plane of rotation. The remaining thin web 26 of the flash 14 being closer to the heat source and being substantially thinner than the protective bead 24 can be rapidly and selectively heated to the glass transition temperature while the protective bead 24, being more massive and preferably being cooled by heat sinks, will remain in a hardened condition except for the portion of the outer edge 12 immediately adjacent the flash 14.

In FIGS. 10 and 11 there is shown in greater detail the finishing of outer edge 12 of the record 10 which occurs at point D on FIG. 1. As shown in FIGS. 10 and 11, the cutter means 30, which has a flat rearward surface 32, is advanced through a tangent point on the outer edge 12 of the record 10. The flat back surface 32 of the cutter means 30 is brought into sliding contact with the outer edge 12 of the record 10 as is best shown in FIG. 11. The outer edge 12 of the record 10, being in a softened condition as a result of being heated to and maintained above its glass transition temperature, is effectively shaped in a finished configuration by the flat back surface 32 of the cutter means 30, the flat back surface 32 in effect being a shaping tool. During the finishing step, the rough edge produced during trimming and imperfections, such as rough spots and strings of plastic extending from the outer edge 12, are corrected to provide a smooth outer surface. The heating of the outer edge 12 and the shaping and finishing are continued until the desired smoothness and roundness is obtained. Once the shaping and finishing of the outer edge 12 is completed, he cutter means 30 is disengaged from the outer edge 12 and the heating is discontinued. The thermoplastic composition at the outer edge 12 is then allowed to cool below its glass transition temperature and solidify in the desired configuration.

In the preferred method of this invention, as described above, the shaping tool which is used is formed as an integral part of the cutter means 30 in that it allows one moving part to conduct two functions, namely, to remove the flash 14 and finish the outer edge 12. It is possible, however, to use a separate tool for trimming the flash 14 and another for finishing the outer edge 12. The forming surface of the shaping tool, whether it is an integral part of the cutter means 30 or a separate tool, can be of various selected shapes so as to impart a given desired configuration to the outer edge 12 of the record 10.

Figure 13:
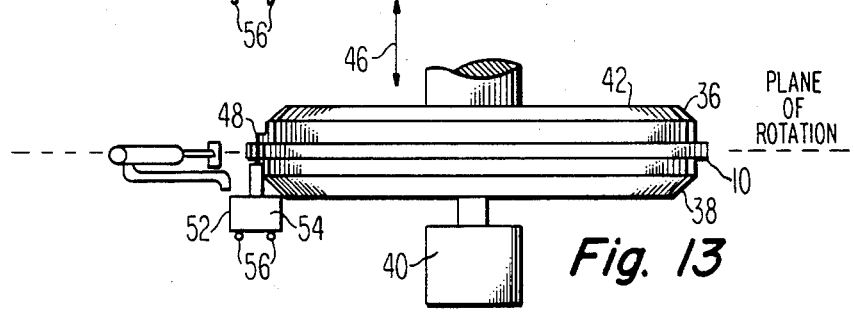
FIG. 13 is a front view of the apparatus illustrated in FIG. 12.

Apparatus 34 for practicing the method of this invention is schematically illustrated in FIGS. 12 and 13. The apparatus 34 includes a support means 36 for holding and rotating a record 10 about its center. The support means 36 has a lower turntable 38 which is connected to a drive motor 40 for rotating the lower turntable 38. An upper turntable 42 is also provided which moves vertically, as indicated by the arrow 46, into and out of engagement with the lower turntable 38 so as to permit loading of a record 10 and thereafter cause the record 10 to rotate. The upper and lower turntables 38, 42 are of diameter so as to extend to and engage the protective bead 24 of a record 10 positioned between them. The upper and lower turntables 38, 42 are made of a good heat conductor, such as aluminum, so as to act as heat sinks to prevent excessive amounts of heat from being transferred to the recorded area 20 of a record 10 held between the turntables 38, 42.

Figure 14:
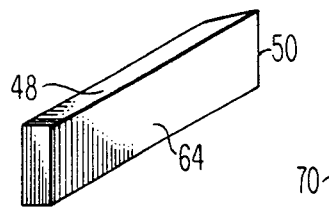
FIG. 14 is an isometric illustration of a cutter blade having a planar back surface.

A cutter 48 is located adjacent the turntables 38, 42 for trimming of flash 14 from a record 10 held between the turntables 38, 42. The cutter 48 illustrated in FIGS. 12 through 14 for use in this invention is a single blade unheated knife having a leading cutting edge 50. Other types of cutters can likewise be used, such as guillotine cutters, scissors cutters, and the like, but for reasons to be explained below, the single blade cutter 48 is the most preferred type of cutter for use with the apparatus 34 of this invention.

The cutter 48 is moveably mounted on a guide means 52 which is positioned adjacent the turntables 38, 42. As best illustrated in FIGS. 12 and 13, the cutter means 48 is mounted on a slide 54 which in turn is guided by a set of rails 56. Other types of guidance systems can be used for directing the cutter means 48. The guide means 50 is specifically designed so as to advance the cutter 48 at a predetermined rate in a path which is tangential to the outer edge 12 of the record 10. The speed of advancement can be selected to removal all of the flash 14 in the course of about one revolution. Preferably, however, the guide means 50 is programmed to advance the cutter 48 rapidly as, for example, in a plunge cut through thick section 28 of the flash 14 and then to remove the thick section 28 during one revolution of the record 10. The cutter 48 is then advanced at a slower rate to remove the remaining thin web 26 of the flash 14 over several additional revolutions.

A further essential part of the apparatus 34 of this invention is a heating means 58 positioned adjacent to the support means 36. The heating means 58 includes a heat source 60 and support structure 62 for positioning the heat source 60. The heat source 60 should be capable of being focused at a relatively small area and of rapidly heating material presented in the area. More specifically, the heat source 60 should be capable of being focused on the flash 14 and outer edge 12 of a record 10 held by the support means 36, and heating the flash 14 to a temperature above its glass transition temperature as the record 10 is rotated past the heat source 60. It is preferable in order to have as uniform a heating as possible, that the heat source 60 be located in the plane of rotation of the record 10 as indicated by the dotted line on FIG. 13. The heat source 60 can be of various types, but preferably is an infrared lamp. The heating means 58 is positioned as close as possible to the cutter 48 so that the cutter 48 so that the cutter 48 is able to trim the flash 14 before it cools down.

Figure 15:
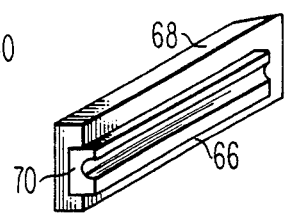
FIG. 15 is an isometric illustration of a cutter blade having an integral curved shaping tool in its back surface.

Another important element of the apparatus 34 of this invention is a shaping means for finishing the outer edge 12 of the trimmed record 10. There are two types of shaping means which are preferably used with the apparatus 34 of this invention. One type of shaping means is formed as an integral part of the cutter 48. More particularly, the back surface 64 of a single blade cutter 48 is shaped to finish the outer edge 12 of a record 10. The most simple and perhaps the most useful shaping tool is formed by using a flat planar rear surface of a single blade cutter 48 to shape the outer edge 12. This is shown in operation in FIGS. 10 and 11 wherein the outer edge 12 of the record 10 is finished with a flat surface 32. Alternatively, the back surface 66 of a single blade cutter 68 can be shaped in the desired configuration or a shaped insert 70 can be secured to the cutter 68 so as to form an integral part of the cutter 68 as shown in FIG. 15.

Figure 16:
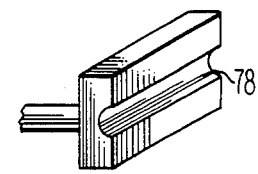
FIG. 16 is an illustration of a shaping tool having a curved forming surface.

An alternate embodiment which can be used with single blade cutters 48, but preferably is used with scissor cutters or the like, includes a separate shaping means 72 positioned adjacent the support means 36. The separate shaping means 72 has an edge shaping tool 74 whose position which is controlled with, for example, an air cylinder 76. The shaping tool 74 mounted in the separate shaping means 72 can have various configurations similar to shaping tools formed as part of the cutter blade 68. The shaping tool 74 can be planar to form a flat on the outer edge 12 or can have a shaped surface such as a concave forming groove 78 as shown in FIG. 16.

In operation, a record 10 having flash 14 attached to its outer edge 12 is positioned on the lower turntable 38 so as to be centered. The upper turntable 42 is then brought into contact with the record 10 so as to hold the record 10 about its protective bead 24. The motor 40 is used to rotate the turntables 38, 42 and thus the record 10 about its center. The heat source 60 is actuated and focused on the flash 14 in the plane of rotation. As the record 10 is rotated, the flash 14 will be heated above its glass transition temperature. Once this point is reached, a cutter, preferably a single blade cutter 48, is advanced in a tangential path toward a point on the outer edge 12 of the record 10. The cutter is preferably rapidly plunged through the thick section 28 of the flash 14 and then held in position while the record 10 is rotated until the thick section 28 of the flash 14 is removed, this being about one revolution of the record 10. Thereafter, the cutter is advanced slowly in a tangential path so as to remove the remaining thin web 26 of flash 14 in a series of revolutions of the record 10. After the leading edge of the cutter has passed through the tangent point, the advance of the cutter is stopped or slowed considerably so the outer edge 12 of the record 10 rotates against the back surface 64 of the cutter which if it has a predetermined shape corresponding to the edge configuration desired to be imparted to the outer edge 12 of the record 10. Alternatively, the cutter, after reaching the tangent point, can be retracted to its starting position and a separate shaping tool 72 brought into contact with the outer edge 12. The record 10 is rotated with the shaping tool 72 in contact with the heated outer edge 12 until the outer edge 12 is finished in the desired configuration.

After the outer edge 12 has been finished in the desired configuration to the required smoothness, the shaping tool, whether it be part of the cutter or a separate tool 72, is disengaged and the heating of the outer edge 12 is discontinued. The outer edge 12 of the record 10 is allowed to cool to a temperature below the glass transition temperature. The upper turntable 42 is then separated from the lower turntable 38 and the trimmed, finished record is removed.

The method and apparatus of this invention has been found to produce finished records having an outer edge quality not heretofore obtainable using the prior art conventional methods. In addition, the problems of breakage and edge cracking due to trimming have been eliminated.

What is claimed is:

1. The method for trimming flash from and finishing the outer edge of a record molded from a thermoplastic composition, said method comprising the steps of:
   (a) rotating the record having flash formed on its outer edge about its center;
   (b) selectively heating the flash and the outer edge of the record immediately adjacent the flash to a temperature above the glass transition temperature of the thermoplastic composition;
   (c) tangentially advancing a cutter means through the heated flash and through a tangent point on the outer edge while simultaneously rotating the record at least one complete revolution to provide a trimmed outer edge;
   (d) bringing an edge shaping means for imparting a predetermined configuration into contact with the trimmed outer edge;
   (e) rotating the record with the trimmed outer edge in contact with said shaping means until the outer edge is shaped to the predetermined configuration; and
   (f) discontinuing heating the outer edge allowing the thermoplastic composition at the outer edge to cool below its glass transition temperature,
whereby the flash is removed from the outer edge of the record and the outer edge is finished in the predetermined configuration.

2. The method according to claim 1 wherein the flash and outer edge are heated immediately prior to being brought into contact with the cutter means.

3. The method according to claim 1 wherein the flash and outer edge are heated by focusing a heat source directly at the flash and outer edge in the plane of rotation of the record.

4. The method according to claim 3 wherein the heating source is an infrared heating lamp.

5. The method according to claim 1 wherein the flash and outer edge are heated to a temperature above the glass transition temperature but below the flow point of the thermoplastic composition.

6. The method according to claim 1 wherein the cutter means is a single blade.

7. The method according to claim 1 wherein the cutter means is advanced at a rate whereby the flash is removed over the course of a plurality of revolutions.

8. The method according to claim 1 wherein the cutter means is a single blade having a leading cutting edge and a back surface in which the shaping means and formed so that when the leading cutting edge is advanced past the tangent point a sufficient distance the shaping means is brought into contact with the outer edge of the record.

9. The method according to claim 8 wherein the shaping means has a planar configuration.

10. The method according to claim 9 wherein the shaping means has a concave configuration.

11. Apparatus for trimming flash from and finishing the outer edge of a record molded from a thermoplastic composition, said apparatus comprising in combination:
   (a) support means for holding and rotating a record about the record's center;
   (b) cutter means for trimming flash from the record;
   (c) guide means adjacent the support means for holding the cutter means and for guiding the cutter means in a path which is tangential to the outer edge of a record positioned on the support means;
   (d) heating means positioned adjacent the support means including a heat source for selectively heating the flash and outer edge of a record positioned on the support means to a temperature above the glass transition temperature of the thermoplastic composition; and
   (e) edge shaping means positioned adjacent the support means for engaging and shaping the trimmed outer edge of a record into a predetermined configuration.

12. The apparatus according to claim 11 wherein the cutter means is a blade member having a leading cutting edge.

13. The apparatus of claim 12 wherein the single blade member has a back portion extending rearward from the cutting edge and wherein the edge shaping means is integral with the back portion of the blade member.

14. The apparatus according to claim 13 wherein the edge shaping means has a planar configuration.

15. The apparatus according to claim 14 wherein the edge shaping means has a concave configuration.

16. The apparatus according to claim 11 wherein the heating means is positioned so as to heat the flash and outer edge of a record held by the support means immediately prior to contact with the cutter means.

17. The apparatus according to claim 16 wherein the heating source is an infrared heat lamp focused on the flash and outer edge of the record.

18. The apparatus according to claim 11 wherein the edge shaping means includes an edge shaping tool having a forming edge corresponding to the predetermined configuration and means for moving the edge shaping tool into sliding contact with the outer edge.

* * * * *

UNITED STATES PATENT AND TRADEMARK OFFICE
CERTIFICATE OF CORRECTION

PATENT NO. : 4,518,551

DATED : May 21, 1985

INVENTOR(S) : Peter T. Lin

It is certified that error appears in the above-identified patent and that said Letters Patent is hereby corrected as shown below:

Column 4, line 57, "other" should read --outer--

Column 5, line 26, "he" should read --the--

Column 6, line 12, "removal" should read --remove--

Column 6, line 39, "so that the cutter 48" should be deleted, second occurrence

Signed and Sealed this

Tenth Day of September 1985

[SEAL]

Attest:

DONALD J. QUIGG

Attesting Officer    Acting Commissioner of Patents and Trademarks - Designate